UNITED STATES PATENT OFFICE.

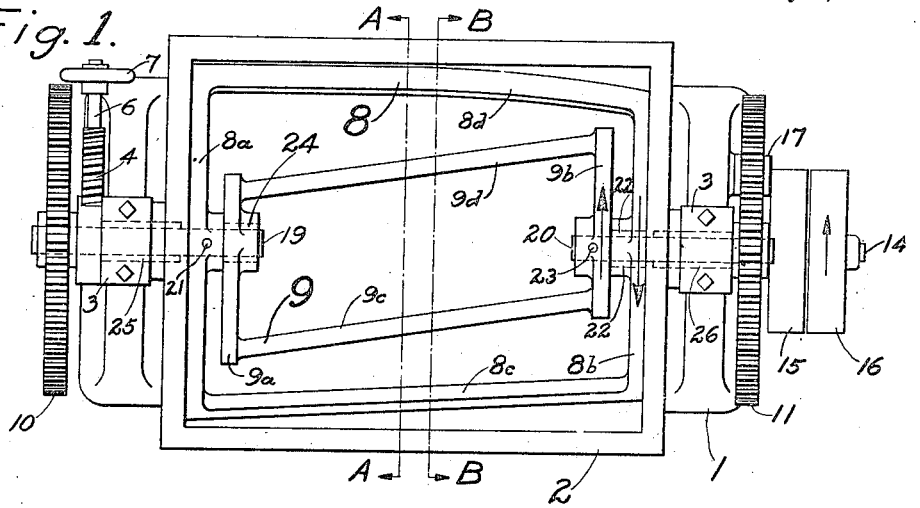
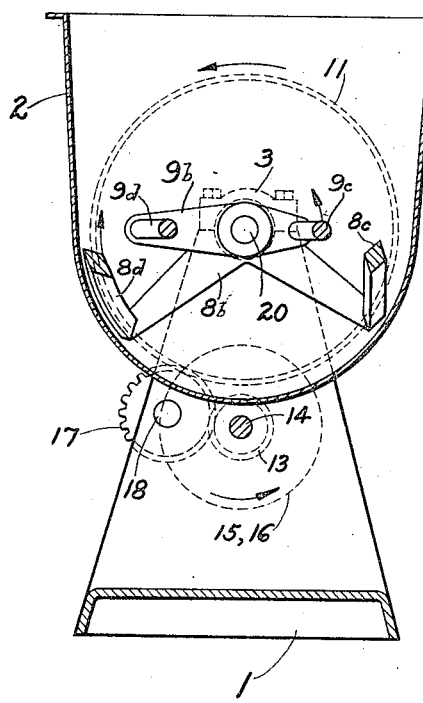
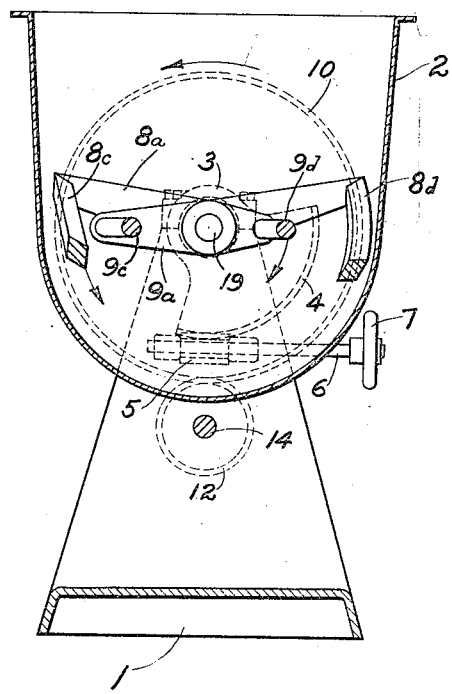

BRYAN D. PINKNEY, OF CINCINNATI, OHIO, ASSIGNOR TO THE TRIUMPH MANUFACTURING COMPANY, OF CINCINNATI, OHIO, A CORPORATION OF OHIO.

DOUGH-MIXING MACHINE.

1,265,375.

Specification of Letters Patent.　　Patented May 7, 1918.

Application filed October 25, 1917.　Serial No. 198,369.

*To all whom it may concern:*

Be it known that I, BRYAN D. PINKNEY, a citizen of the United States, residing at Cincinnati, in the county of Hamilton and State of Ohio, have invented a new and useful Dough-Mixing Machine, of which the following is a specification.

My invention relates to improvements in machines for the mixing and the kneading of dough, and similar masses of a doughy or plastic nature in which a plurality of rotating arms comprise the agitator; and the objects of my improvement are, first, to subject the contents to a thorough and uniform mixing, causing the dry and liquid ingredients to become correctly blended and mixed, and then to assume the form of a partially cohesive mass; and second, by the continued action of the agitator, to so completely knead and stretch the dough or plastic mass by means of a relative accelerated agitator speed, that plenty of air is beaten in and the desired chemical action soon results, causing the gluten to be fully developed and the mass to prove well and make a finer grained, whiter, and larger loaf for the weight.

I attain these objects by the mechanism illustrated in the accompanying drawings, in which—

Figure 1 is a plan view of my improved mixer; Fig. 2, a transverse section taken at line A—A, Fig. 1; Fig. 3, a transverse section taken at line B—B, Fig. 1.

Similar numerals refer to similar parts throughout the several views.

Referring to the drawings, the frame 1 supports the bowl or receptacle 2, constructed to receive the ingredients to be mixed and mounted with cap 3, in the frame 1, so that it can be tilted forward to discharge the mixed batch. The tilting may be done in any suitable manner, such as by means of a chordal wormwheel 4, attached to the bowl trunnion, meshing with a worm 5, suitably mounted on shaft 6, operated by power or by manual means by means of a handwheel 7.

The agitator comprises a pair of blades or arms, an outer mixing arm 8, and an inner kneading and stretching arm 9; said inner kneading and stretching arm 9 rotates in an opposite direction to said mixing arm 8. The outer mixing arm 8, and the inner kneading and stretching arm 9, are rotatably mounted in the trunnions of the receptacle 2, and rotated in any suitable manner, such as for example, through the medium of gears 10, 11, and pinions 12, 13, and actuated by a drive shaft 14, on which is secured tight and loose pulleys 15, 16, or any other suitable means, through which the motive power is applied to the mixer. Between gear 11 and pinion 13 an idler gear 17 is intermeshed and mounted on stud 18, which causes the gear 11 to rotate in an opposite direction to gear 10. This, in turn, causes the outer mixing arm 8 and the inner kneading and stretching arm 9 to rotate in opposite directions, so that, for example, if the arm 8 rotates twenty-five times per minute in the one direction and the arm 9 rotates twenty-five times per minute in the opposite direction, there will be a relative speed of fifty rotations per minute between them. The outside diameter of arm 8 is greater than the outside of arm 9, hence the peripheral speed of its diameter is greater than the peripheral speed of the diameter of arm 9 for the same number of rotations per minute. Now it is very desirable to have as little speed of the arm 8 as is consistent, in order to reduce the temperature of the batch while being mixed, and yet it must have sufficient speed to do correct mixing. By rotating the arm 9 in the opposite direction to arm 8, while the outer arm 8 makes, for example, but twenty-five turns per minute, the inner arm 9 makes, for example, twenty-five turns per minute in the opposite direction, so that between them there is a relative speed of fifty rotations per minute. By the outer arm 8 rotating at a lower velocity it causes very little friction (in reference to the receptacle 2), and so the temperature is kept very low. It is desirable that the temperature of the dough while being mixed shall not exceed eighty-two degrees, Fahrenheit. I have found from experience that it is preferable to impart an accelerated opposing speed to the inner arm 9, that is, the inner arm 9 should make a greater number of rotations per minute than the outer arm 8, and in an opposite direction.

The outer or mixing arm 8 comprises a pair of end members or spiders 8ª, 8ᵇ, rotatably mounted on shafts 19, 20, on which said shafts are mounted the gears 10, 11. The outer or mixing arm 8 is rigidly connected to shaft 19, by means of a key or pin 21, and rotates idly on shaft 20, said shaft 20 rotating in an opposite direction to shaft 19. The part of arm 8 that rotates idly on shaft 20 is provided with a stuffing-box of any familiar construction, or a bushing 22, with suitable lubricating connections of familiar construction, hence not shown in the drawing. The arms of spiders 8ª, 8ᵇ, are staggered, and placed relatively opposite, and connected at their contiguous ends with bar 8ᶜ and bar 8ᵈ in an opposing direction, so that when the bar 8ᶜ is rotated in the direction of the arrow (see Fig. 1) it will move the ingredients to the left of the bowl or receptacle 2, and bar 8ᵈ will move the ingredients to the right. I have shown bar 8ᶜ straight throughout its entire length and bar 8ᵈ curved to conform to the curved shape of the bowl 2, and to work in close proximity with said curved portion of bowl 2 to serve as a scraper for each complete rotation of the arm 8, although bar 8ᶜ may be curved to conform to the curved shape of the bowl 2 to act as a scraper, if more scraping action in the bowl is necessary.

The inner or kneading and stretching arm 9 comprises a pair of end members or spiders 9ª, 9ᵇ, rotatably mounted on shafts 19, 20, on which said shafts are mounted the gears 10, 11. The inner or kneading and stretching arm 9 is rigidly connected to shaft 20, by means of a key or pin 23, and rotates idly on shaft 19, said shaft 19 rotating in an opposite direction to shaft 20. The part of arm 9 that rotates idly on shaft 19 is provided with a stuffing-box of any familiar construction, or a bushing 24, with suitable lubricating connections of familiar construction, hence not shown in the drawing. The spiders 9ª, 9ᵇ, are arranged in the same plane, that is, they are not staggered, each end member 9ª, 9ᵇ, having one long part and one shorter part, and are placed diametrically opposite. The connecting bars 9ᶜ, 9ᵈ, connect the opposite ends of spiders 9ª, 9ᵇ, in an opposing direction so that the direction of bar 9ᶜ diverges toward the axis of rotation to the right, and bar 9ᵇ diverges toward the axis of rotation to the left. The bars 9ᶜ, 9ᵈ, may be straight throughout their length as shown in Fig. 1, or they may be curved slightly.

In the bowl trunnions of receptacle 2 are stuffing boxes of familiar construction, or bushing 25, 26, with suitable lubricating connections of familiar construction, hence not shown in the drawing.

The operation of my improved dough mixing machine is as follows: The ingredients to be mixed (usually for bread doughs, which comprise flour, salt, sugar, lard, yeast and water) are placed in receptacle 2 either just before the dough mixing machine is operated, or while it is being operated. The ingredients generally are such that must first be blended (which blending takes place in the mixing process before the ingredients assume the form of a cohesive mass), and then kneaded and stretched. The bars 8ᶜ and 8ᵈ, on account of their side-thrust action while rotating, work the unmixed portion of the ingredients back and forth until they are of sufficient consistency that they will yield to the kneading and stretching action of bars 9ᶜ and 9ᵈ, in connection with bars 8ᶜ and 8ᵈ, the stretching taking place due to the opposite rotations of the outer arm 8 and the inner arm 9. This process produces the desired chemical action and develops the gluten, and makes a dough of maximum strength in a minimum of time, and at a comparatively low temperature.

Having thus described my invention, what I claim as new and desire to secure by Letters Patent, is—

1. In a dough mixing machine, the combination comprising a receptacle, an agitator therefor, said agitator being composed of an outer mixing part and an inner kneading part arranged to rotate concentrically within said receptacle, said outer part being provided with oppositely disposed spiders and an oppositely composed pair of thrust mixer bars connecting the outer contiguous ends of the spiders, and arranged to travel in close proximity to the curved wall of the receptacle; said inner kneading part being provided with oppositely disposed spiders and an oppositely composed pair of inwardly-diverging kneader bars arranged to rotate within said outer mixer part; and means for imparting an opposite rotary speed to the inner kneading part of the agitator, substantially as described.

2. In a dough mixing machine, the combination comprising a receptacle, an agitator therefor, said agitator being composed of an outer mixing part and an inner kneading part, arranged to rotate concentrically in the opposite direction within said receptacle, a driving shaft connected to one end of the outer mixing part, the opposite end of the outer mixing part to rotate idly on the driving shaft of the inner kneading part of the agitator, a driving shaft connected to one end of said inner kneading part, the opposite end of the inner kneading part to rotate idly on the driving shaft of the outer mixing part of the agitator, gear mechanism for imparting rotary speed to the agitator, and means for running in reverse direction to the outer mixing part the inner kneading part for the purpose of both mixing and kneading the ingredients, substantially as described.

In testimony whereof I have hereunto set my hand in presence of two subscribing witnesses.

BRYAN D. PINKNEY.

Witnesses:
CHAS. W. MUELLER,
HOWARD GROSHELL.